(12) United States Patent
Desclaux

(10) Patent No.: US 9,239,913 B2
(45) Date of Patent: Jan. 19, 2016

(54) METHOD FOR OBFUSCATING A COMPUTER PROGRAM

(75) Inventor: Fabrice Desclaux, Montigny le Bretonneux (FR)

(73) Assignee: EUROPEAN AERONAUTIC DEFENCE AND SPACE COMPANY-EADS FRANCE, Paris (FR)

( * ) Notice: Subject to any disclaimer, the term of this patent is extended or adjusted under 35 U.S.C. 154(b) by 0 days.

(21) Appl. No.: 13/201,503

(22) PCT Filed: Feb. 23, 2010

(86) PCT No.: PCT/EP2010/052276
§ 371 (c)(1),
(2), (4) Date: Jan. 17, 2012

(87) PCT Pub. No.: WO2010/097382
PCT Pub. Date: Sep. 2, 2010

(65) Prior Publication Data
US 2012/0110349 A1 May 3, 2012

(30) Foreign Application Priority Data
Feb. 24, 2009 (FR) ..................................... 09 51161

(51) Int. Cl.
G06F 21/00 (2013.01)
G06F 21/14 (2013.01)

(52) U.S. Cl.
CPC ..................................... G06F 21/14 (2013.01)

(58) Field of Classification Search
None
See application file for complete search history.

(56) References Cited

U.S. PATENT DOCUMENTS

| 7,287,166 | B1* | 10/2007 | Chang et al. | 713/187 |
| 7,739,511 | B2* | 6/2010 | Horne et al. | 713/176 |
| 7,770,016 | B2* | 8/2010 | Horne et al. | 713/176 |
| 8,140,850 | B2* | 3/2012 | Horne et al. | 713/176 |
| 8,327,452 | B2* | 12/2012 | Oneda | 726/26 |
| 2005/0183072 | A1* | 8/2005 | Horning et al. | 717/140 |
| 2006/0031686 | A1* | 2/2006 | Atallah et al. | 713/190 |
| 2006/0218539 | A1* | 9/2006 | Stiemens et al. | 717/140 |
| 2007/0234070 | A1* | 10/2007 | Horning et al. | 713/190 |
| 2008/0028474 | A1* | 1/2008 | Horne et al. | 726/27 |

(Continued)

FOREIGN PATENT DOCUMENTS

| WO | 99/01815 A1 | 1/1999 |
| WO | 2005/020068 A2 | 3/2005 |

OTHER PUBLICATIONS

Collberg et al; "Watermarking, Tamper-Proofing, and Obfuscation-Tools for Software Protection", IEEE Transactions on Software Engineering, vol. 28, No. 8, Aug. 2002, pp. 735-746 ISSN: 0098-5589.

(Continued)

*Primary Examiner* — Jeffery Williams
(74) *Attorney, Agent, or Firm* — Pearne & Gordon LLP

(57) ABSTRACT

The invention relates to a method for obfuscating a computer program.
Said method comprises the following steps:
a—selecting a numerical variable V used by said program or an instruction of said program using said numerical value V,
b—defining at least one operation which provides said numerical value V when executed,
c—substituting at least one line of said program using the numerical value V for at least one new program line performing the operation that supplies the value of said numerical variable V.

5 Claims, 1 Drawing Sheet

(56) References Cited

U.S. PATENT DOCUMENTS

| | | | |
|---|---|---|---|
| 2008/0046865 A1* | 2/2008 | Kerschbaum | 717/106 |
| 2008/0215891 A1* | 9/2008 | Horne et al. | 713/187 |
| 2008/0301452 A1* | 12/2008 | Horne et al. | 713/176 |
| 2009/0083521 A1* | 3/2009 | Sato et al. | 712/220 |
| 2009/0138704 A1* | 5/2009 | Delerablee | 713/158 |
| 2009/0177873 A1* | 7/2009 | Sato et al. | 712/233 |
| 2009/0307500 A1* | 12/2009 | Sato et al. | 713/190 |
| 2010/0199354 A1* | 8/2010 | Eker et al. | 726/26 |

OTHER PUBLICATIONS

Cohen; "Operating system protection through program evolution", Computers and Security, Oct. 1993, vol. 12, No. 6, pp. 565-584, ISSN: 0167-4048.

International Search Report for PCT/EP2010/052276 dated May 12, 2010.

* cited by examiner

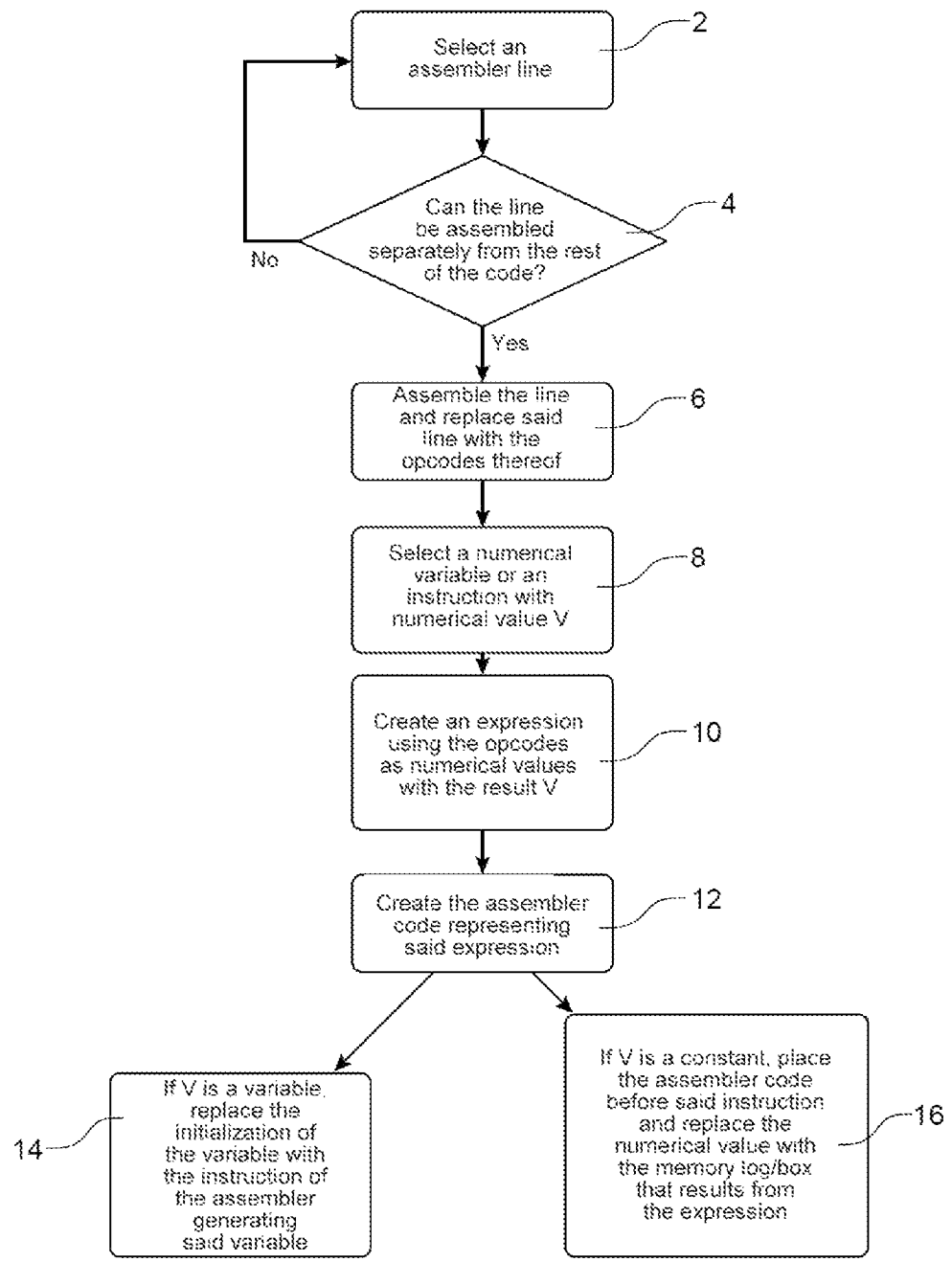

METHOD FOR OBFUSCATING A COMPUTER PROGRAM

TECHNICAL FIELD

The invention relates to the field of protecting data and computer programs, and more specifically relates to a method for obfuscating a computer program so as to prevent it from being disassembled, i.e. to prevent the reconstruction of the source code from the executable code and/or patching by unauthorized persons.

The invention also relates to a computer program recorded on a medium and including lines of instructions that, when they are executed by a computer, make it possible to obtain the obfuscation of said program.

The invention also relates to a use of the method according to the invention to obfuscate a computer program recorded on a medium and intended to perform the functions of a flight simulator when it is executed on a computer.

BACKGROUND OF THE INVENTION

The known techniques for obfuscating computer programs are essentially based on the use of utility softwares called "packers," the function of which consists of compressing the executable program (.exe, .dll, .ocx, etc.) and simultaneously encrypting it.

The packers are therefore made up of two parts:
the compression/encrypting routine, outside the compressed program;
the decompression/decrypting method onboard the compressed program.

The packers are more adapted to protection from copying than to obfuscating programs. Moreover, software tools called "depackers" exist that are able to automatically eliminate the protection placed on a program using a packer. Furthermore, packers introduce transformations into the program to be protected that complexify the execution thereof.

One aim of the invention is to perform a simple and effective obfuscation of a program without complexifying its execution.

Another aim of the invention is to mask the transformations of a program.

BRIEF DESCRIPTION OF THE INVENTION

These aims are achieved using a method for obfuscating a computer program including the following steps:
a—selecting a numerical variable V used by said program or an instruction of said program using said numerical value V,
b—defining at least one operation which provides said numerical value V when executed,
c—substituting at least one line of said program using the numerical value V for at least one new program line performing the operation that supplies the value of said numerical variable V.

In a preferred embodiment, the inventive method also includes a step consisting of assembling the new program line to obtain the opcodes thereof and using the obtained opcodes as operands of the operation supplying the numerical value V.

Furthermore, the method according to the invention includes a step consisting of replacing the value of said numerical variable V with the result of the operation defined in step b).

Owing to the method according to the invention, it is impossible to distinguish between the instructions from the program and the data used by said instructions.

In a first alternative embodiment of the invention, the numerical encoding of the instruction using the numerical value V is replaced by the addressed memory location pointed to by the operation whereof the execution provides said numerical value V.

In the preferred embodiment, steps a), b) and c) of the inventive method are repeated recursively.

BRIEF DESCRIPTION OF THE DRAWINGS

Other features and advantages of the invention will emerge from the following description, provided as a non-limiting example, in reference to the appended figure illustrating the essential steps of the method.

DETAILED DESCRIPTION OF THE INVENTION

The invention applies to the obfuscation of a computer program recorded on a medium and intended to perform, when it is executed by a computer, simulation functions, security data processing or industrial process management.

In general, the method according to the invention is applicable to all computer programs having a plurality of lines of instructions written in a source language and intended to be translated by a compiler in a target language. The source language can for example be a programming language with a high level of abstraction and the target language is an assembly language or machine language called object code.

In one particular embodiment, the inventive method is used to obfuscate a computer program representing a flight simulator.

The appended figures illustrate the essential steps of the inventive method.

In step 2, a specific line of the source code is selected.

Preferably, a line is selected including an instruction or essential data of the program that one wishes to mask.

Step 4 consists in verifying that the selected line can be assembled independently of the other lines of the source code.

If the selected line can be assembled independently of the other lines of the source code, the assembly of the selected line is executed and it is replaced by these opcodes.

Else, a line is re-selected including an instruction or essential data of the program that one wishes to mask and step 4 is executed.

In step 8, a numerical variable V or an instruction with a numerical value V is selected.

In step 10, an operation is defined whereof the execution provides said numerical value V and at least one line of the program to be masked is substituted by a new program line performing said operation.

In step 12, the assembler code representing the operation defined in step 10 is generated.

In a first alternative embodiment of the inventive method shown by step 14, if V is a numerical variable, the initialization of said variable is replaced with the expression that makes it possible to obtain it.

In another variant embodiment shown by step 16, if V is a constant numerical value, the assembler code representing the operation defined in step 10 is placed before the instruction chosen in step 8 and the numerical value V is replaced by the register or the memory address containing the result of the operation defined in step 10.

The two alternative embodiments are respectively illustrated by the first example and the second example described below.

In the first example, the first code shows that the numerical value 0x12 is replaced by a calculation using the "non-numerical" element situated at address 0x2, in this case an instruction opcode 0x89 from which it subtracts 0x77 to find the value 0x12.

The original code is the following:

```
00000002 89ca            mov edx, ecx
00000012 83c612          add esi, 0x12
```

The code modified by the inventive method is the following:

```
00000002 89ca              mov edx, ecx
00000012 0fb63d02000000    movzx edi, byte ptr[0x2]
00000019 83ef77            sub edi, 00000077
0000001c 01fe              add esi, edi
```

In the second example, a global value situated at address 0x2000 worth 0x11223344 is replaced with the value 0xec53f375 from which the code removes a non-numerical element. In that case, the opcodes of the instructions at address 0x4 and 0x6 respectively equal to 31c0 and 31db result at 0x11223344, i.e. the original value.

The original code is:

```
00000004 31c0              xor       eax, eax
00000006 31db              xor       ebx, ebx
00000008 90                nop
00000009 8b3d00000000      mov edi, [0x2000]
0000000f 83ff12            cmp edi, 00000012
00002000 44332211          global value = 0x11223344
```

The code modified by the inventive method is:

```
00000004 31c0              xor eax, eax
00000006 31db              xor ebx, ebx
00000008 90                nop
00000009 8b3d00200000      mov edi, [0x2000]
0000000f 2b3d04000000      sub edi, [0x4]
00000015 83ff12            cmp edi, 0x12
00002000 75f353ec          global value = 0xec53f37.
```

The invention claimed is:

1. A method for obfuscating a computer program, said method being executed by a computer in order to prevent disassembly of said computer program, retrieval of source code of said computer program, or modification of said computer program by unauthorized persons, said method including following steps:
   a—selecting a numeric variable V or an instruction with a numerical value V of said computer program,
   b—storing said variable V, by said computer, at a first memory address;
   c—defining at least one new operation which provides a value of said variable V when said at least one operation is executed by the computer, wherein the at least one new operation replaces the numeric variable V or the instruction with the numerical value V with a non-numeric value;
   d—replacing at least one line of said computer program that uses said numeric variable V or said instruction with the numerical value V with at least one new program line performing said at least one new operation; and
   e—assembling said at least one new program line to obtain opcodes thereof, wherein an opcode is used for the non-numeric value of step c).

2. The method according to claim 1, further comprising replacing the numerical encoding of said at least one new operation with a memory address containing the result of said at least one new operation.

3. The method according to claim 1 or 2, wherein steps a) to e) are repeated recursively.

4. A computer program recorded on a non-transitory computer readable medium and comprising lines of instructions executed by a computer in order to prevent disassembly of said computer program, retrieval of source code of said computer program, or modification of said computer program by unauthorized persons, said instructions making it possible to obtain obfuscation of said program by:
   a—selecting a numeric variable V or an instruction with a numerical value V of said computer program,
   b—storing said variable V, by said computer, at a first memory address;
   c—defining at least one new operation which provides a value of said variable V when said at least one operation is executed by the computer, wherein the at least one new operation replaces the numeric variable V or the instruction with the numerical value V with a non-numeric value;
   d—replacing at least one line of said computer program that uses said numeric variable V or said instruction with the numerical value V with at least one new program line performing said at least one new operation; and
   e—assembling said at least one new program line to obtain opcodes thereof, wherein an opcode is used for the non-numeric value of step c).

5. A flight simulator comprising a non-transitory computer readable medium for executing, by a computer, a computer program recorded on a medium and comprising lines of instructions in order to prevent disassembly of said computer program, retrieval of source code of said computer program, or modification of said computer program by unauthorized persons, said instructions making it possible to obtain obfuscation of said program by:
   a—selecting a numeric variable V or an instruction with a numerical value V of said computer program,
   b—storing said variable V, by said computer, at a first memory address;
   c—defining at least one new operation which provides a value of said variable V when said at least one operation is executed by the computer, wherein the at least one new operation replaces the numeric variable V or the instruction with the numerical value V with a non-numeric value;
   d—replacing at least one line of said computer program that uses said numeric variable V or said instruction with the numerical value V with at least one new program line performing said at least one new operation; and
   e—assembling said at least one new program line to obtain opcodes thereof, wherein an opcode is used for the non-numeric value of step c).

* * * * *